Patented Sept. 26, 1922.

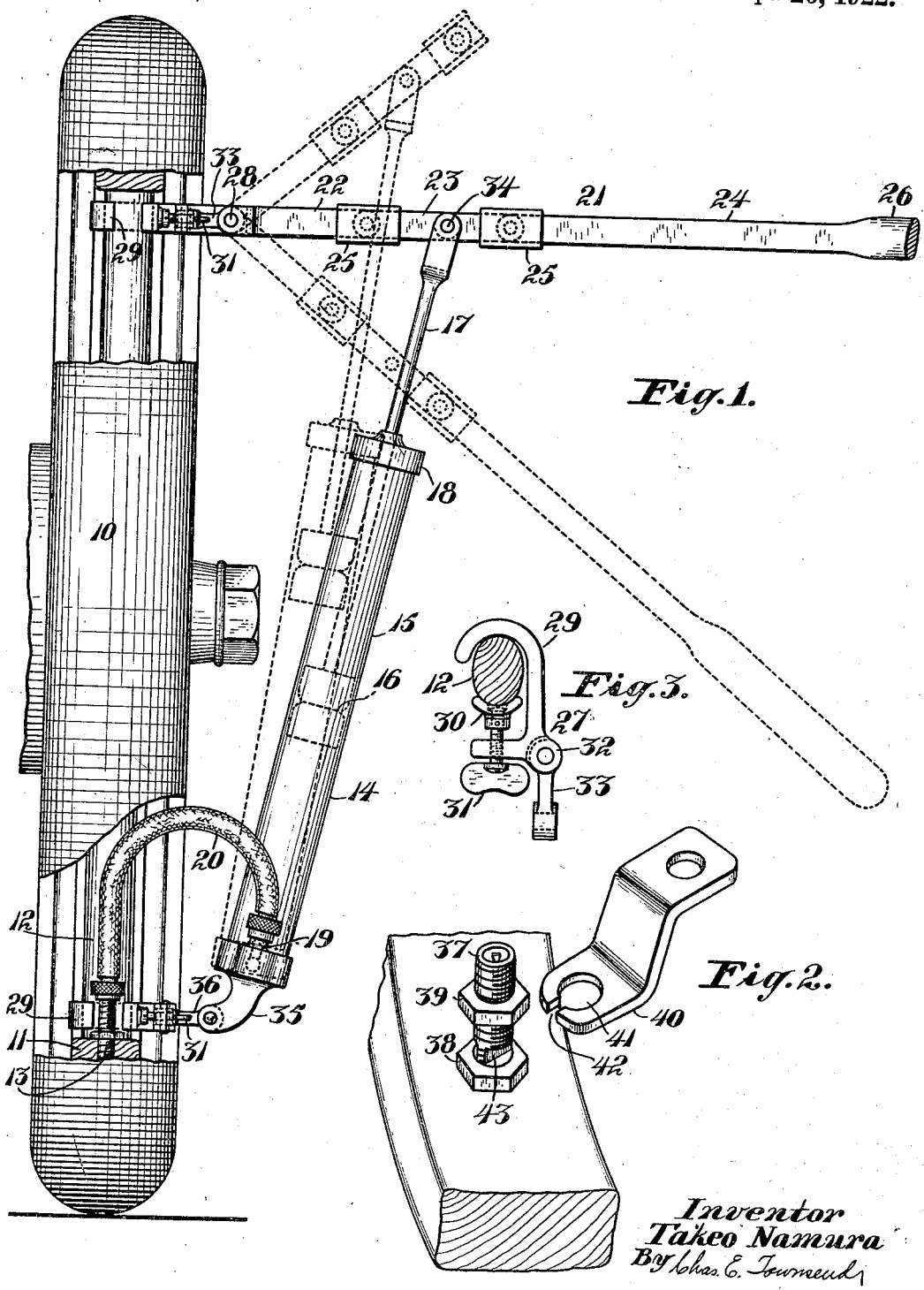

1,430,250

UNITED STATES PATENT OFFICE.

TAKEO NAMURA, OF WALNUT GROVE, CALIFORNIA.

TIRE PUMP.

Application filed June 8, 1921. Serial No. 476,047.

*To all whom it may concern:*

Be it known that I, TAKEO NAMURA, a citizen of the Empire of Japan, residing at Walnut Grove, in the county of Sacramento and State of California, have invented new and useful Improvements in Tire Pumps, of which the following is a specification.

This invention relates to a pump, and particularly pertains to a portable tire pump. Heretofore it has been common practice to use a tire pump for inflating the pneumatic tires of automobiles and bicycles, which pump has been unsatisfactorily held by the foot of the operator while the plunger was being actuated; and it is the principal object of the present invention to provide a pneumatic tire pump which may be rigidly held in a convenient position relative to an automobile wheel and which will permit the pump to be directly and rapidly operated. The present invention contemplates the use of a pump structure, one end of which is adapted to be secured to a spoke of a vehicle wheel, the pump being further fitted with a lever operating mechanism which has its fulcrum in a detachable fitting secured to another spoke of the vehicle wheel.

The invention is illustrated by way of example in the accompanying drawing, in which—

Fig. 1 is an enlarged view in section in elevation showing the operation of the pump and having parts broken away for the sake of clearness;

Fig. 2 is a fragmentary view in perspective showing a modified fitting for the pump;

Fig. 3 is a view in section in elevation showing one of the spoke clamps.

Referring more particularly to the drawing, 10 indicates a pneumatic tire mounted upon a suitable wheel felloe 11 carried by spokes 12. The tire is, of course, fitted with a valve stem 13 through which air may be delivered to the casing of the tire from a pump 14. This pump comprises the usual cylindrical casing 15 enclosing a piston 16. The piston is carried at the lower end of a rod 17 which reciprocates through the end cap 18 of the casing. The lower end of the casing is fitted with an outlet connection 19 to which an air tube 20 is secured. This air tube is equipped with means whereby it may be detachably connected to the valve stem 13 in the tire, thus conducting air from the pump to the tire. The piston rod 17 is actuated by a lever 21. This lever is here shown as comprising three pieces, 22, 23, and 24 respectively. The various sections of the lever are pivotally connected to each other so that the pump may be folded up and packed in a very small compartment. Sliding sleeves 25 are provided to slip over the joints of the lever sections, thus making a continuous straight beam of the entire lever. A handle 26 may be secured at the outer end of the lever. The opposite end of the lever formed by the terminus of the lever section 22, is pivotally connected to a mounting 27 by a pin 28. The member 27 comprises a C-shaped fitting 29, as shown in Fig. 3, said fitting embracing the spoke and cooperating with a clamp 30 to rigidly clamp against the spoke. A clamp screw 31 is provided for this purpose. A lug 32 is formed as a part of the member 29 and carries a shackle 33 which provides a universal connection between the end of the pump lever and the clamp. The pump lever is pivotally connected to the intermediate section 23 of the lever beam, as indicated at 34.

Formed at the lower end of the pump casing is an extension 35 which is pivotally connected to a shackle member 36 providing a universal mounting for the lower end of the pump on a clamp 27, as previously described.

In the form of the invention shown in Figs. 1 and 3 the clamps may be removed when the pump is not in use. However, in Fig. 2 a device is shown which is permanently mounted upon the felloe of the vehicle wheel for clamping the pump in an operative position. This comprises a stud bolt 37 extending through the felloe of the wheel and held in position by a lock nut 38. A nut 39 is mounted upon this bolt to clamp a clip 40 in position. The clip 40 is formed with an opening 41 having a slotted passageway 42 in its sides, said passageway accommodating a narrowed portion 43 in the bolt, thus allowing the clip to be readily applied to the bolt and thereafter clamped by the nut 29. It is understood that the clip may be suitably secured to a shackle 36 connecting it to the casing extension 35 and also to the pump lever.

In the operation of the present invention the pump is either applied by securing it to the permanent bolts 37, or by fastening the C-shaped clamps around the spokes of the vehicle wheel. The lever beam may be unfolded and the sleeves 25 slipped over its hinge joints, after which oscillating movement of the lever will produce reciprocation of the pump rod 15 with a resultant delivery of air to the tire through the tube 20. It will thus be seen that the construction here disclosed provides a pump which may be rigidly held relative to a tire and which not only supplies leverage for actuating the pump plunger, but also insures that the pump may be operated directly and rapidly.

While I have shown the preferred form of my invention, it is to be understood that various changes may be made in the construction by those skilled in the art without departing from the spirit of the invention.

Having thus described my invention, what I claim and desire to secure by Letters Patent is:

1. A tire pump comprising a pair of clamps adapted to be secured to the spokes of a vehicle wheel, a pump cylinder, a piston therein, a piston rod for said piston, a pivotal connection between one end of said cylinder and one of said clamps, and a lever handle pivotally connected to the other of said clamps and to the piston rod.

2. A tire pump comprising a cylinder, a piston therein, a piston rod for said piston, a pair of supporting members adapted to be detachably secured to a vehicle wheel, means for universally connecting one end of said cylinder to one of said members, a lever handle pivotally connected at a point intermediate its ends to the piston rod, and a universal connection between the fulcrum of said lever and the other of said supporting members.

3. A tire pump comprising a pair of clamps adapted to be detachably secured to the spokes of a vehicle wheel; a pump comprising a cylinder piston and piston rod; means for universally connecting the outer end of said pump to one of said clamps; a lever handle pivotally connected to the piston rod at a point intermediate its ends; and a universal connection between the fulcrum of said lever and the other clamp.

4. A tire pump comprising a pair of clamps adapted to be detachably secured to the spokes of a vehicle wheel; a pump comprising a cylinder piston and piston rod; means for universally connecting the outer end of said pump to one of said clamps; a lever handle pivotally connected to the piston rod at a point intermediate its ends; a universal connection between the fulcrum of said lever and the other clamp; and means for folding said handle.

TAKEO NAMURA.